(12) United States Patent
Takimoto et al.

(10) Patent No.: US 11,092,124 B2
(45) Date of Patent: Aug. 17, 2021

(54) CONNECTOR

(71) Applicant: Sumitomo Riko Company Limited, Komaki (JP)

(72) Inventors: Yorihiro Takimoto, Komaki (JP); Yoshiki Kodaka, Komaki (JP); Ryousuke Kanegae, Komaki (JP); Makoto Ito, Komaki (JP); Ryuji Shibata, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 16/858,972

(22) Filed: Apr. 27, 2020

(65) Prior Publication Data
US 2020/0256294 A1 Aug. 13, 2020

Related U.S. Application Data

(63) Continuation of application No. PCT/JP2019/026225, filed on Jul. 2, 2019.

(30) Foreign Application Priority Data

Jul. 17, 2018 (JP) .............................. JP2018-133847

(51) Int. Cl.
*F02M 37/00* (2006.01)
*F02M 37/04* (2006.01)
(Continued)

(52) U.S. Cl.
CPC ........ *F02M 37/0017* (2013.01); *F02M 37/00* (2013.01); *F02M 37/0023* (2013.01);
(Continued)

(58) Field of Classification Search
CPC ............... F02M 37/00; F02M 37/0017; F02M 37/0023; F02M 37/0029; F02M 37/0041;
(Continued)

(56) References Cited

U.S. PATENT DOCUMENTS 5,365,906 A * 11/1994 Deweerdt .......... F02M 37/0023
123/467
6,053,712 A * 4/2000 Konishi ............. F02M 63/0225
417/540
(Continued)

FOREIGN PATENT DOCUMENTS

DE 102015224941 A1 * 6/2017 ........... F16K 39/024
EP 0877163 A1 * 11/1998 ........... F02M 59/464
(Continued)

OTHER PUBLICATIONS

Aug. 20, 2019 International Search Report issued in International Patent Application No. PCT/JP2019/026225.
(Continued)

*Primary Examiner* — John M Zaleskas
(74) *Attorney, Agent, or Firm* — Oliff PLC (57) ABSTRACT

A connector includes: a connector body formed in a tubular shape; a valve housing formed in a tubular shape and provided inside the connector body with a seal structure interposed therebetween, the seal structure restricting flow of fuel between the valve housing and an inner circumferential surface of the connector body; and a valve body stored inside the valve housing, the valve body being configured to, when high-pressure fuel does not flow back, come into a first state in which a forward flow path is formed between the valve body and an inner circumferential surface of the valve housing by a pressure of low-pressure fuel, and when the high-pressure fuel flows back, come into a second state in which an orifice flow path having a smaller flow path sectional area than the forward flow path is formed between the valve body and the inner circumferential surface of the valve housing.

11 Claims, 4 Drawing Sheets

(51) Int. Cl.
*F02M 55/00* (2006.01)
*F02M 55/02* (2006.01)
*F16L 37/38* (2006.01)
*F02M 55/04* (2006.01)
*F02M 37/06* (2006.01)

(52) U.S. Cl.
CPC ............ *F02M 37/04* (2013.01); *F02M 37/06* (2013.01); *F02M 55/004* (2013.01); *F02M 55/025* (2013.01); *F16L 37/38* (2013.01); *F02M 55/04* (2013.01)

(58) Field of Classification Search
CPC ........ F02M 37/04; F02M 37/06; F02M 55/00; F02M 55/04; F02M 59/464; F02M 55/004; F16K 15/025; F16K 15/026; F16K 15/04; F16K 15/044; F16K 27/0209; F16L 37/38
See application file for complete search history.

(56) References Cited

U.S. PATENT DOCUMENTS

| | | | | |
|---|---|---|---|---|
| 6,953,052 B2* | 10/2005 | Lehtonen | ............ | F02M 55/025 123/198 DB |
| 7,124,738 B2 | 10/2006 | Usui et al. | | |
| 7,401,594 B2 | 7/2008 | Usui et al. | | |
| 7,441,545 B1* | 10/2008 | Fisher | .................. | F02D 33/006 123/446 |
| 7,444,990 B1* | 11/2008 | Fisher | .................. | F02D 33/006 123/459 |
| 2002/0036015 A1* | 3/2002 | Miyajima | ............... | F16L 33/30 137/543.23 |
| 2002/0125452 A1* | 9/2002 | Martin-Cocher | ....... | F16L 37/38 251/149.6 |
| 2004/0060599 A1* | 4/2004 | Miyajima | ............. | F16K 17/082 137/515 |
| 2006/0185738 A1* | 8/2006 | Nishiyama | ............. | F16L 37/40 137/543.23 |
| 2006/0185739 A1* | 8/2006 | Niki | ........................ | F16L 37/40 137/543.23 |
| 2006/0196557 A1* | 9/2006 | Niki | .................... | F16K 27/0209 137/543.23 |
| 2006/0231078 A1* | 10/2006 | Barylski | ............ | F02M 37/0082 123/511 |
| 2009/0068041 A1* | 3/2009 | Beardmore | ........... | F04B 49/035 417/540 |
| 2010/0101538 A1* | 4/2010 | Beardmore | .......... | F02M 59/466 123/495 |
| 2011/0114064 A1* | 5/2011 | Akita | .................... | F02M 55/007 123/495 |
| 2011/0259302 A1* | 10/2011 | Kim | ....................... | F02M 59/26 123/506 |
| 2011/0278775 A1* | 11/2011 | Germano | ........... | B60G 17/0528 267/64.23 |
| 2012/0073546 A1* | 3/2012 | Blom | ........................ | B08B 9/00 123/506 |
| 2012/0251367 A1* | 10/2012 | Furuhashi | ........... | F04B 53/1082 417/505 |
| 2013/0213504 A1* | 8/2013 | Yabuuchi | ........... | F02M 63/0056 137/565.15 |
| 2013/0312706 A1* | 11/2013 | Salvador | ............ | F02M 63/0245 123/457 |
| 2013/0333672 A1* | 12/2013 | Ryoo | .................. | F02M 37/0041 123/506 |
| 2014/0224209 A1* | 8/2014 | Pursifull | ............. | F02D 41/3845 123/294 |
| 2014/0305410 A1* | 10/2014 | Lucas | .................... | F02M 41/00 123/456 |
| 2015/0027416 A1* | 1/2015 | Brostrom | ............. | F02M 59/462 123/495 |
| 2015/0068491 A1* | 3/2015 | Jensen | ............... | F02M 37/0023 123/294 |
| 2015/0337753 A1* | 11/2015 | Stickler | ............... | F02M 63/005 123/506 |
| 2016/0230913 A1* | 8/2016 | Hatanaka | ............ | F16L 37/0885 |
| 2016/0258402 A1* | 9/2016 | Abbas | .................. | F02M 59/025 |
| 2016/0363104 A1* | 12/2016 | Sanborn | ................ | F02D 41/401 |
| 2016/0377017 A1* | 12/2016 | Basmaji | ............ | F02D 41/3094 701/103 |
| 2017/0037824 A1* | 2/2017 | Mack | ..................... | F16K 15/025 |
| 2017/0050513 A1* | 2/2017 | Hatanaka | ............... | B60K 15/04 |
| 2019/0003432 A1* | 1/2019 | Kurt | .................. | F02M 37/0023 |
| 2019/0153983 A1* | 5/2019 | Mason | ............... | F02M 37/0094 |
| 2020/0248661 A1* | 8/2020 | Kanegae | ................ | F02M 55/04 |
| 2020/0386357 A1* | 12/2020 | Taguchi | ................ | F16L 37/086 |

FOREIGN PATENT DOCUMENTS

| | | | | |
|---|---|---|---|---|
| JP | 2000-265926 A | | 9/2000 | |
| JP | 2001207930 A | * | 8/2001 | ......... F02M 63/0225 |
| JP | 2007-218264 A | | 8/2007 | |
| WO | WO-2007093571 A1 | * | 8/2007 | ......... F16K 27/0209 |
| WO | WO-2017121578 A1 | * | 7/2017 | ......... F02M 63/0225 |

OTHER PUBLICATIONS

Aug. 20, 2019 Written Opinion issued in International Patent Application No. PCT/JP2019/026225.
Jun. 1, 2021 Office Action issued in Chinese Patent Application No. 201980006163.1.

* cited by examiner

CONNECTOR

CROSS REFERENCE TO RELATED APPLICATIONS

The present application is a Continuation Application of International Application No. PCT/JP2019/026225, filed on Jul. 2, 2019, which is incorporated herein by reference. The present invention is based on Japanese Patent Application No. 2018-133847, filed on Jul. 17, 2018, the entire contents of which are incorporated herein by reference.

BACKGROUND OF THE INVENTION

1. Field of the Invention

The present invention relates to a connector.

2. Description of the Related Art

As described in JP2007-218264A and JP2000-265926A, there are fuel supply systems in which low-pressure fuel supplied from a fuel tank by a low-pressure pump is pressurized by a high-pressure pump and the pressurized high-pressure fuel is supplied to an internal combustion engine. In the fuel supply systems, due to driving of the high-pressure pump, pulsation occurs in the low-pressure pipe through which the low-pressure fuel flows, and therefore reduction of the pulsation is required.

In JP2007-218264A, in order to reduce pulsation in the low-pressure pipe, a damper mechanism is provided. In JP2000-265926A, in order to reduce pulsation in the low-pressure pipe, a return path for returning a part of the fuel from the high-pressure pump to the low-pressure pipe side is provided and a solenoid valve and an orifice for opening the return path are provided.

SUMMARY OF THE INVENTION

However, providing the damper mechanism or the return path complicates the structure and leads to cost increase. An object of the present invention is to provide a connector that enables reduction of pulsation in the low-pressure pipe with use of a simple structure in a fuel supply system that supplies high-pressure fuel.

A connector according to the present invention is a connector to be connected to a low-pressure pipe through which low-pressure fuel supplied from a low-pressure pump flows, in a fuel supply system in which the low-pressure fuel is pressurized by a high-pressure pump and high-pressure fuel is supplied to an internal combustion engine. The connector includes: a connector body formed in a tubular shape; a valve housing formed in a tubular shape and provided inside the connector body with a seal structure interposed therebetween, the seal structure being configured to restrict flow of fuel between the valve housing and an inner circumferential surface of the connector body; and a valve body stored inside the valve housing, the valve body being configured to, when the high-pressure fuel does not flow back, come into a first state in which a forward flow path is formed between the valve body and an inner circumferential surface of the valve housing by a pressure of the low-pressure fuel, and when the high-pressure fuel flows back, come into a second state in which an orifice flow path having a smaller flow path sectional area than the forward flow path is formed between the valve body and the inner circumferential surface of the valve housing.

In the case where the high-pressure fuel flows back, the valve body comes into the second state, so that the orifice flow path is formed inside the connector. That is, the orifice flow path is interposed between the high-pressure pump and the low-pressure pump. Owing to the action of the orifice flow path, pulsation in the low-pressure pipe on the low-pressure pump side with respect to the connector is reduced.

On the other hand, in the case of the steady state in which the high-pressure fuel does not flow back, the valve body comes into the first state, so that the forward flow path larger than the orifice flow path is formed between the valve housing and the valve body. In the steady state, the valve body comes into the first state in which the forward flow path is formed by the pressure of the low-pressure fuel. Thus, the low-pressure fuel is assuredly supplied to the high-pressure pump side. That is, in the steady state, the valve body does not hamper flow of the low-pressure fuel.

In addition, the valve housing and the valve body are configured to be mounted in the connector. Thus, the valve housing and the valve body are easily provided. Here, in the case where the high-pressure fuel flows back, the valve body comes into the second state in which the orifice flow path is formed. If a flow path is formed between the inner circumferential surface of the connector body and the valve housing, the flow path may serve as an orifice flow path. This may hinder exertion of a desired pulsation reducing effect based on the orifice flow path between the valve housing and the valve body.

Considering the above, the valve housing is provided with a seal structure interposed for restricting flow of fuel between the valve housing and the inner circumferential surface of the connector body. Providing the seal structure prevents formation of a flow path between the connector body and the valve housing. Thus, the orifice flow path formed between the valve housing and the valve body exerts a desired pulsation reducing effect.

Further, the valve unit including the valve housing and the valve body is assembled in advance outside the connector body. Thus, adjustment regarding the forward flow path and the orifice flow paths becomes easy, thereby enabling exertion of a desired pulsation reducing effect.

Conceivably, the valve housing and the valve body are assumed to be mounted at the low-pressure pipe, instead of being mounted in the connector. However, in the case where the valve housing and the valve body are mounted at the pipe, formation of a seal structure between the pipe and the valve housing is not easy. As a result, the orifice flow path between the valve housing and the valve body may be hindered from exerting a desired pulsation reducing effect. Therefore, as in the present invention, mounting the valve housing and the valve body inside the connector body enables the pulsation reducing effect to be easily and assuredly exerted.

DESCRIPTION OF THE EMBODIMENTS

1. Structure of Fuel Supply System 1

Figure 1:
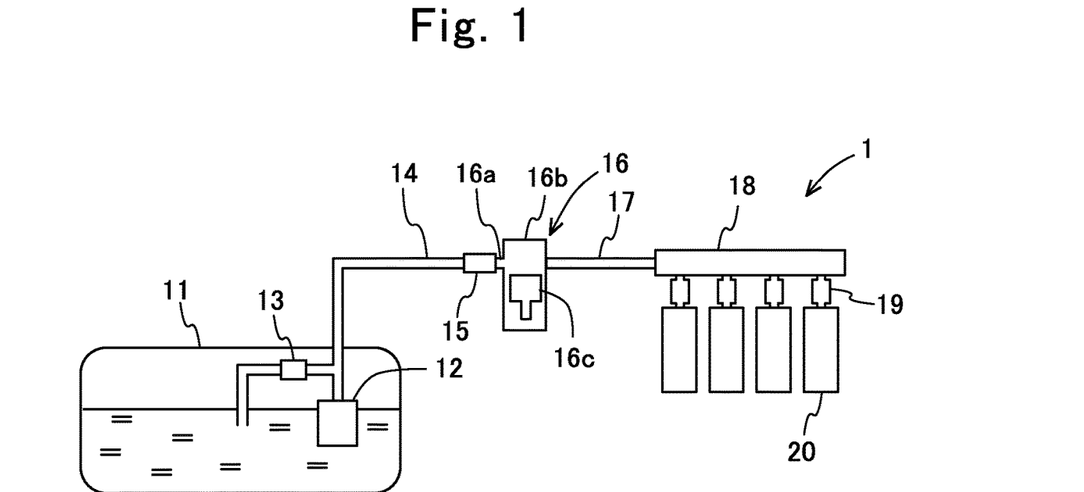
FIG. 1 shows a fuel supply system.

The structure of a fuel supply system 1 will be described with reference to FIG. 1. As shown in FIG. 1, the fuel supply system 1 is a system for performing supply from a fuel tank 11 to an internal combustion engine 20. Specifically, in the fuel supply system 1, low-pressure fuel supplied from a low-pressure pump 12 is pressurized by a high-pressure pump 16 and the high-pressure fuel is supplied to the internal combustion engine 20. The fuel supply system 1 includes the fuel tank 11, the low-pressure pump 12, a pressure regulator 13, a first low-pressure pipe 14, a connector 15, a high-pressure pump 16, a high-pressure pipe 17, a common rail 18, an injector 19, and the internal combustion engine 20.

The low-pressure pump 12 is provided inside the fuel tank 11, and a first end of the first low-pressure pipe 14 made of resin is connected to the discharge side of the low-pressure pump 12. That is, the low-pressure pump 12 pressure-feeds fuel stored in the fuel tank 11, to the first low-pressure pipe 14 side. The pressure regulator 13 is provided at the low-pressure pump 12 side on the first low-pressure pipe 14, inside the fuel tank 11. By the pressure regulator 13, the pressure of low-pressure fuel in the first low-pressure pipe 14 is regulated to a certain pressure.

A second end of the first low-pressure pipe 14 is connected to a first end (first tube portion 31 described later) of the connector 15. A second end (second tube portion 32 described later) of the connector 15 is connected to a second low-pressure pipe 16a provided integrally with the high-pressure pump 16. That is, the connector 15 is connected to low-pressure pipes (first low-pressure pipe 14 and second low-pressure pipe 16a) through which low-pressure fuel flows. More specifically, the connector 15 connects the first low-pressure pipe 14 and the second low-pressure pipe 16a, and forms a flow path for supplying low-pressure fuel, together with the first low-pressure pipe 14 and the second low-pressure pipe 16a.

Low-pressure fuel supplied from the low-pressure pump 12 and the pressure regulator 13 and having a certain pressure is introduced into a pump body 16b of the high-pressure pump 16 via the first low-pressure pipe 14, the connector 15, and the second low-pressure pipe 16a, and the pump body 16b discharges the pressurized high-pressure fuel. The pump body 16b of the high-pressure pump 16 pressurizes the low-pressure fuel by, for example, a reciprocating movement of a plunger 16c. For example, the plunger 16c is configured to perform a reciprocating movement by a cam moving in conjunction with a crankshaft. In this case, the plunger 16c continues performing a reciprocating movement while the crankshaft is operating.

The high-pressure fuel pressurized by the pump body 16b of the high-pressure pump 16 is supplied to the common rail 18 via the high-pressure pipe 17. The common rail 18 is provided with the injectors 19 the number of which corresponds to the number of cylinders of the internal combustion engine 20, and the injectors 19 are mounted to the internal combustion engine 20. Thus, the high-pressure fuel is injected to the internal combustion engine 20 via the common rail 18 and the injectors 19.

2. Operation of Fuel Supply System 1

Operation of the fuel supply system 1 will be described with reference to FIG. 1. In the case where high-pressure fuel needs to be supplied to the internal combustion engine 20, the low-pressure pump 12 and the high-pressure pump 16 operate. That is, by the low-pressure pump 12 operating, low-pressure fuel flows through the first low-pressure pipe 14, the connector 15, and the second low-pressure pipe 16a in the forward direction (direction from the low-pressure pump 12 to the high-pressure pump 16), and the low-pressure fuel is pressurized by the high-pressure pump 16. Then, the high-pressure fuel pressurized by the high-pressure pump 16 is supplied to the internal combustion engine 20 via the high-pressure pipe 17, the common rail 18, and the injectors 19.

On the other hand, during operation of the internal combustion engine 20, if high-pressure fuel need not be supplied to the internal combustion engine 20, high-pressure fuel is not supplied from the injectors 19 to the internal combustion engine 20. Since the plunger 16c of the high-pressure pump 16 operates in conjunction with the cam of the crankshaft, the plunger 16c is not stopped. At this time, if the low-pressure pump 12 continues operating, the low-pressure fuel continues being supplied to the high-pressure pump 16 via the first low-pressure pipe 14, the connector 15, and the second low-pressure pipe 16a. Therefore, the high-pressure fuel pressurized by the high-pressure pump 16 sometimes may flow back to the second low-pressure pipe 16a, the connector 15, and the first low-pressure pipe 14.

The backflow of the high-pressure fuel may cause pulsation in the first low-pressure pipe 14. Due to the pulsation in the first low-pressure pipe 14, the first low-pressure pipe 14 may vibrate, leading to occurrence of noise or the like. However, the connector 15 has a function of reducing the pulsation in the first low-pressure pipe 14. Thus, the pulsation in the first low-pressure pipe 14 is reduced and occurrence of noise or the like is suppressed.

3. Structure of Connector 15 in First Embodiment 3-1. Entire Structure of Connector 15

Figure 2:
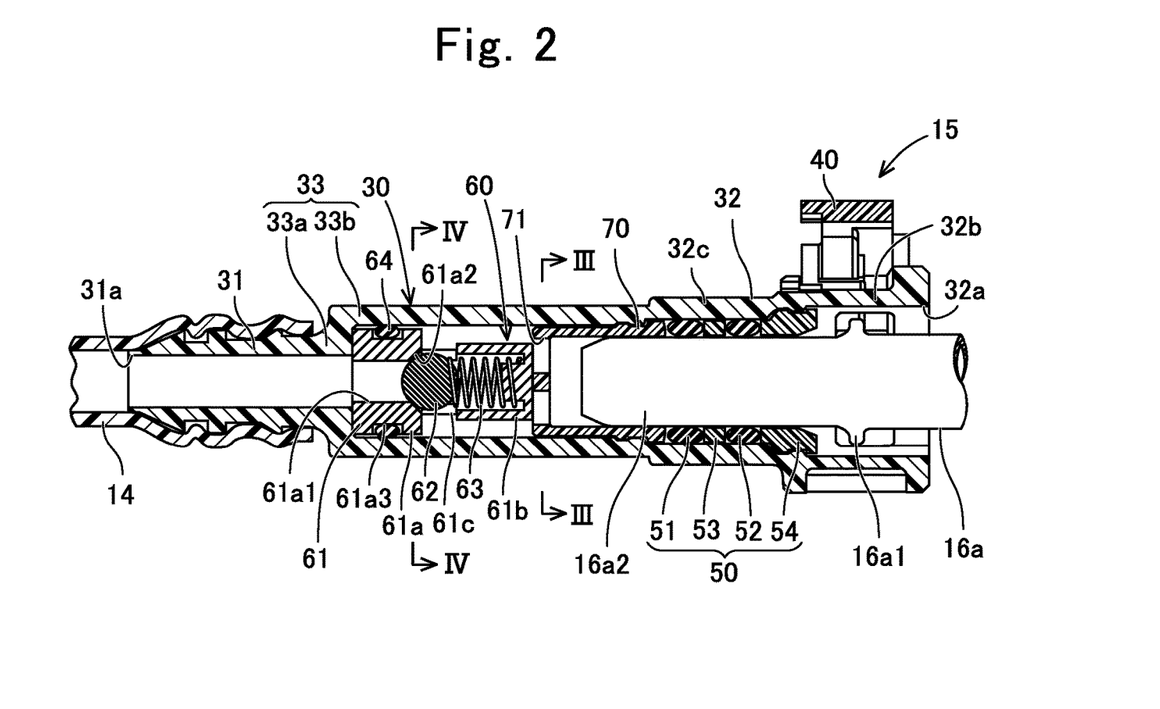
FIG. 2 is a sectional view of a connector according to the first embodiment, taken along the axial direction, and shows the case where a valve unit composing the connector is in a second state, and in the drawing, the left side is a first low-pressure pipe (low-pressure pump) side, the right side is a second low-pressure pipe (high-pressure pump) side, and the retainer is at an initial position.
Figure 3:
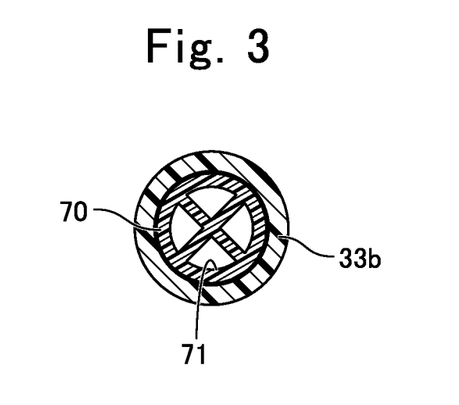
FIG. 3 is a sectional view taken along line III-III in FIG. 2, and is a sectional view of apart including a fixation bush, taken along the radial direction.

The structure of the connector 15 will be described with reference to FIG. 2 and FIG. 3. As shown in FIG. 2, the connector 15 connects the first low-pressure pipe 14 and the second low-pressure pipe 16a and allows fuel to flow between the first low-pressure pipe 14 and the second low-pressure pipe 16a. An end of the first low-pressure pipe 14 is externally fitted to the first end side of the connector 15, and an end of the second low-pressure pipe 16a is inserted to the second end side of the connector 15.

Here, the first low-pressure pipe 14 is, for example, made of resin, and is formed in a thin tubular shape. Therefore, the first low-pressure pipe 14 is formed to be deformable so as to increase the diameter thereof, as compared to the connector 15. The second low-pressure pipe 16a is, for example, made of metal or hard resin, and is formed in a tubular shape. The end of the second low-pressure pipe 16a has an annular flange 16a1 (also called bead) formed so as to protrude outward in the radial direction at a position distant in the axial direction from the endmost point, and an end portion 16a2 which is a small-diameter part on the head end side with respect to the annular flange 16a1.

The connector 15 includes a connector body 30, a retainer 40, a seal unit 50, a valve unit 60, and a fixation bush 70. The connector body 30 is formed in a tubular shape having a first opening 31a and a second opening 32a at both ends. Thus, the connector body 30 allows fuel to flow between the first opening 31a connected to the first low-pressure pipe 14, and the second opening 32a connected to the second low-pressure pipe 16a. In other words, the connector body 30 is a member for fuel to flow between the first opening 31a and the second opening 32a.

In the present embodiment, the connector body 30 is formed in a straight tubular shape. However, the connector body 30 is not limited to a straight shape, but may be formed in a tubular shape having a bent portion (not shown), such as L-shaped tubular shape. The connector body 30 is integrally molded with hard resin, and is formed from one member. For example, the connector body 30 is integrally molded by injection molding. The connector body 30 is made of, for example, glass fiber reinforced polyamide.

The connector body 30 has the first tube portion 31, the second tube portion 32, and a third tube portion 33 when divided in the flow path direction. In the flow path direction, the first tube portion 31, the third tube portion 33, and the second tube portion 32 are connected in this order.

The first tube portion 31 is a part to be connected to the first low-pressure pipe 14. The first tube portion 31 is a part having the first opening 31a and is formed in a straight tubular shape. The first opening 31a is an opening on a side where the end of the first low-pressure pipe 14 is externally fitted. The first tube portion 31 corresponds to an area that overlaps the first low-pressure pipe 14 in the flow path direction in a state in which the end of the first low-pressure pipe 14 is fitted to the outer circumference of the first tube portion 31 on the first opening 31a side. That is, the outer circumferential surface of the first tube portion 31 is opposed to the inner circumferential surface of the first low-pressure pipe 14, in the radial direction, over the entire length.

The inner circumferential surface of the first tube portion is formed in a cylindrical shape. Further, the inner circumferential surface of the first tube portion 31 forms a surface with which fuel comes into direct contact. On the other hand, the outer circumferential surface of the first tube portion 31 is formed in a recessed and projecting shape in a cross section taken along the flow path direction so that the first low-pressure pipe 14 externally fitted thereto does not come off. Here, the first tube portion 31 is formed of a material that is less deformable than the first low-pressure pipe 14. Therefore, in a state in which the first low-pressure pipe 14 is externally fitted to the first tube portion 31, the first tube portion 31 is hardly deformed while the diameter of the first low-pressure pipe 14 is expanded. That is, the first low-pressure pipe 14 is deformed along the recesses and projections on the outer circumferential surface of the first tube portion 31.

The second tube portion 32 is a part connected to the second low-pressure pipe 16a, and is a part at which the retainer 40 and the seal unit 50 are placed. The second tube portion 32 includes a retainer placement portion 32b on the second opening 32a side.

The retainer placement portion 32b has a hole penetrating in the radial direction and is a part at which the retainer 40 is placed. The retainer placement portion 32b is configured to be engaged with the retainer 40 in the radial direction. The second tube portion 32 includes a seal portion 32c on a side of the retainer placement portion 32b opposite to the second opening 32a. The inner circumferential surface of the seal portion 32c is formed in a cylindrical shape. The seal unit 50 is provided on the inner circumferential side of the seal portion 32c. Here, the diameter of the inner circumferential surface of the second tube portion 32 is greater than the diameter of the inner circumferential surface of the first tube portion 31. The diameter of the inner circumferential surface of the first tube portion 31 is equal to the inner diameter of the second low-pressure pipe 16a.

The third tube portion 33 is a part where the valve unit 60 and the fixation bush 70 are provided. The third tube portion 33 connects a side of the first tube portion 31 opposite to the first opening 31a, and a side of the second tube portion 32 opposite to the second opening 32a, in the flow path direction. The third tube portion 33 corresponds to an area in which neither the first low-pressure pipe 14 nor the second low-pressure pipe 16a is present.

The third tube portion 33 includes a small-diameter tube portion 33a and a large-diameter tube portion 33b. The small-diameter tube portion 33a is connected coaxially to the first tube portion 31. Thus, the small-diameter tube portion 33a is located on the first opening 31a side in the third tube portion 33. The diameter of the inner circumferential surface of the small-diameter tube portion 33a is equal to the diameter of the inner circumferential surface of the first tube portion 31. Thus, the small-diameter tube portion 33a forms a small-diameter flow path in the third tube portion 33.

The large-diameter tube portion 33b is connected coaxially to the second tube portion 32. Thus, the large-diameter tube portion 33b is located on the second opening 32a side in the third tube portion 33. The diameter of the inner circumferential surface of the large-diameter tube portion 33b is almost equal to the diameter of the inner circumferential surface of a part to which the endmost part (part having an opening in the end portion 16a2) of the second low-pressure pipe 16a is inserted, in the second tube portion 32. Thus, the large-diameter tube portion 33b forms a large-diameter flow path in the third tube portion 33. In the present embodiment, the large-diameter tube portion 33b and the small-diameter tube portion 33a are connected coaxially with each other.

The retainer 40 is made of, for example, glass fiber reinforced polyamide. The retainer 40 is retained at the retainer placement portion 32b of the connector body 30. The retainer 40 is a member for coupling the connector body 30 and the second low-pressure pipe 16a with each other. It is noted that the retainer 40 is not limited to the structure described below and various known structures may be employed.

The retainer 40 is movable in the radial direction of the retainer placement portion 32b by operator's push-in operation and pull-out operation. When the second low-pressure pipe 16a is inserted to a regular position in the second tube portion 32, the retainer 40 becomes movable from an initial position shown in FIG. 2 (position shown in FIG. 2) to a confirmation position (position moved downward in FIG. 2; position shown in FIG. 5). Therefore, when the retainer 40 is allowed to be pushed-in, the operator can confirm that the second low-pressure pipe 16*a* has been inserted to the regular position in the second tube portion 32.

In a state in which the retainer 40 is pushed-in to the confirmation position, the retainer 40 is engaged with the annular flange 16*a*1 of the second low-pressure pipe 16*a* in the pipe pull-out direction so that the retainer 40 prevents the second low-pressure pipe 16*a* from being pulled out. That is, by performing push-in operation of the retainer 40, the operator can confirm that the second low-pressure pipe 16*a* has been inserted to the regular position in the second tube portion 32 and the second low-pressure pipe 16*a* is prevented by the retainer 40 from being pulled out.

The seal unit 50 restricts flow of fuel between the inner circumferential surface of the second tube portion 32 of the connector body 30 and the outer circumferential surface of the second low-pressure pipe 16*a*. The seal unit 50 includes annular seal members 51, 52 made of fluororubber or the like, a collar 53 made of resin and sandwiched in the axial direction between the annular seal members 51, 52, and a bush 54 made of resin and positioning the annular seal members 51, 52 and the collar 53 in the seal portion 32*c* of the second tube portion 32. On the inner circumferential side of the seal unit 50, the end portion 16*a*2 of the second low-pressure pipe 16*a* is inserted, and the annular flange 16*a*1 of the second low-pressure pipe 16*a* is located on the second opening 32*a* side with respect to the seal unit 50.

The valve unit 60 is located on the first tube portion 31 side inside the third tube portion 33 of the connector body 30. That is, the valve unit 60 is positioned in contact with an end surface of a step at the boundary between the small-diameter tube portion 33*a* and the large-diameter tube portion 33*b* of the third tube portion 33. The valve unit 60 functions to allow the low-pressure fuel to flow in the forward direction in the case where the high-pressure fuel does not flow back, and reduce pulsation in the case where the high-pressure fuel flows back. The valve unit 60 includes a valve housing 61, a valve body 62, an energizing member 63, and an elastic seal member 64.

The valve housing 61 is made of metal or hard resin and formed in a tubular shape. The valve housing 61 includes a valve housing body 61*a*, an energizing member mounting portion 61*b*, and a connection portion 61*c*. The valve housing body 61*a* is formed in a tubular shape, and is in contact with the end surface of the step at the boundary between the small-diameter tube portion 33*a* and the large-diameter tube portion 33*b* of the third tube portion 33. A center hole 61*a*1 of the valve housing body 61*a* communicates with the hole of the first tube portion 31 of the connector body 30.

The valve housing body 61*a* has a first contact portion 61*a*2 formed in a tapered shape, at a part connecting the center hole 61*a*1 and an end surface on a side opposite to the first tube portion 31. The diameter of the first contact portion 61*a*2 increases from the center hole 61*a*1 toward the end surface. The outer circumferential surface of the valve housing body 61*a* has an annular seal groove 61*a*3. The outermost circumferential surface of the valve housing body 61*a* is spaced by a slight gap from the inner circumferential surface of the large-diameter tube portion 33*b* of the third tube portion 33.

The energizing member mounting portion 61*b* is located so as to be distant in the axial direction from the valve housing body 61*a*. The energizing member mounting portion 61*b* is formed in a bottomed tubular shape and has an opening side facing the valve housing body 61*a* side. Further, the energizing member mounting portion 61*b* has a protrusion at the bottom thereof. The outer circumferential surface of the energizing member mounting portion 61*b* is sufficiently distant from the inner circumferential surface of the large-diameter tube portion 33*b* of the third tube portion 33. That is, a flow path for fuel is formed between the outer circumferential surface of the energizing member mounting portion 61*b* and the inner circumferential surface of the large-diameter tube portion 33*b*.

The connection portion 61*c* connects the valve housing body 61*a* and the energizing member mounting portion 61*b*. The connection portion 61*c* allows communication between the center hole 61*a*1 of the valve housing body 61*a* and an outer peripheral area around the energizing member mounting portion 61*b*. The connection portion 61*c* has, at least, communication paths at two locations in the circumferential direction. However, the connection portion 61*c* may have a communication path at one location or may have communication paths at three or more locations.

The valve body 62 has a spherical shape. The valve body 62 is stored inside the valve housing 61. More specifically, most part of the valve body 62 is stored in the connection portion 61*c* and is movable in the axial direction of the connection portion 61*c* inside the connection portion 61*c*. Further, the valve body 62 is contactable with the first contact portion 61*a*2 of the valve housing body 61*a*. That is, the valve body 62 moves between a position in contact with the first contact portion 61*a*2 of the valve housing body 61*a* and a position separate therefrom.

The energizing member 63 is mounted to the energizing member mounting portion 61*b*, and energizes the valve body 62 toward the first contact portion 61*a*2. The energizing member 63 is a coil spring, as an example. However, another type of spring may be applied. The energizing member 63 is externally fitted to the protrusion provided at the bottom of the energizing member mounting portion 61*b*, and is guided by the inner circumferential surface of the tubular part of the energizing member mounting portion 61*b*. Thus, since the attitude of the energizing member 63 is maintained, an energizing force in a direction toward the first contact portion 61*a*2 is assuredly applied to the valve body 62. In addition, the energizing force of the energizing member 63 is set to be not greater than the pressure of the low-pressure fuel. Therefore, the energizing member 63 is compressed when the pressure of the low-pressure fuel is applied thereto.

The elastic seal member 64 is, for example, an O ring. The elastic seal member 64 is mounted to the seal groove 61*a*3 formed on the outer circumferential surface of the valve housing body 61*a*. Further, the elastic seal member 64 is in contact with the inner circumferential surface of the large-diameter tube portion 33*b* of the third tube portion 33 of the connector body 30 in a state in which the elastic seal member 64 is compressed. Thus, the elastic seal member 64 serves as a seal structure for restricting flow of fuel between the inner circumferential surface of the large-diameter tube portion 33*b* and the outer circumferential surface of the valve housing body 61*a*. That is, the valve housing body 61*a* is provided in a state in which the elastic seal member 64 as a seal structure is interposed between the valve housing body 61*a* and the inner circumferential surface of the large-diameter tube portion 33*b* of the third tube portion 33.

The fixation bush 70 is made of metal or hard resin, and is formed in a bottomed tubular shape, as shown in FIG. 2. In the bottom surface of the fixation bush 70, a plurality of through holes 71 are arranged in the circumferential direction as shown in FIG. 3. The plurality of through holes 71 serve as a flow path for fuel. The bottom surface of the fixation bush 70 comes into contact with the energizing member mounting portion 61*b* of the valve housing 61. That is, the fixation bush 70 is a member for restricting the flow-path-direction position of the valve housing 61 relative to the connector body 30. The outer circumferential surface of the fixation bush 70 is formed in a recessed and projecting shape, and is engaged with a recessed and projecting shape of the inner circumferential surface of the third tube portion 33. Thus, the fixation bush 70 is fixed to the third tube portion 33.

3-2. Detailed Structure of Valve Housing Body 61a

The detailed structure of the valve housing body 61a will be described with reference to FIG. 4. As described above, the valve housing body 61a has the tapered first contact portion 61a2. The valve housing body 61a has a plurality of first orifice grooves 61a4 at the part where the first contact portion 61a2 is formed. Each first orifice groove 61a4 may be formed in a straight shape in the axial direction, or may be formed in a helical shape.

Figure 4:
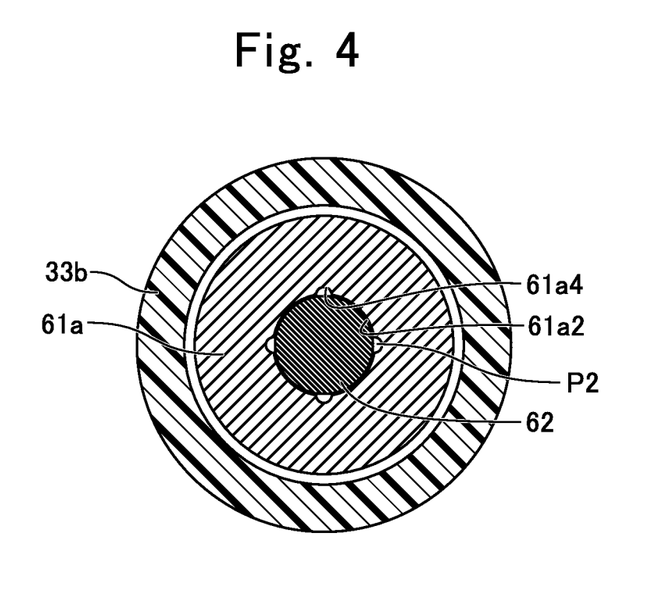
FIG. 4 is an enlarged sectional view taken along line IV-IV in FIG. 2, and is a sectional view of apart including a valve housing, taken along the radial direction.

As shown in FIG. 4, the plurality of first orifice grooves 61a4 may be provided at regular intervals in the circumferential direction. Thus, the first orifice grooves 61a4 are provided so as to be adjacent to the first contact portion 61a2 in the circumferential direction. Here, the case where four first orifice grooves 61a4 are formed on the valve housing body 61a is shown as an example. However, the number of the first orifice grooves 61a4 may be three or less, or may be five or more. Providing the plurality of first orifice grooves 61a4 at regular intervals enables fuel to flow in a balanced manner.

3-3. Action of Valve Unit 60

Figure 5:
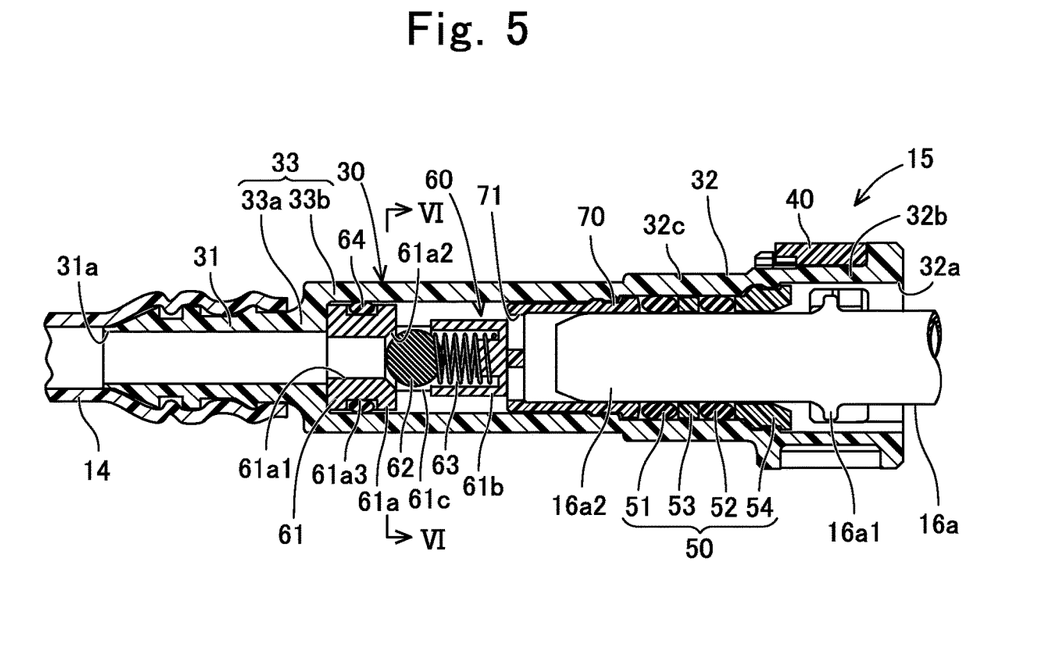
FIG. 5 is a sectional view of the connector according to the first embodiment, taken along the axial direction, and shows the case where the valve unit is in a first state, and in the drawing, the retainer is at a confirmation position.
Figure 6:
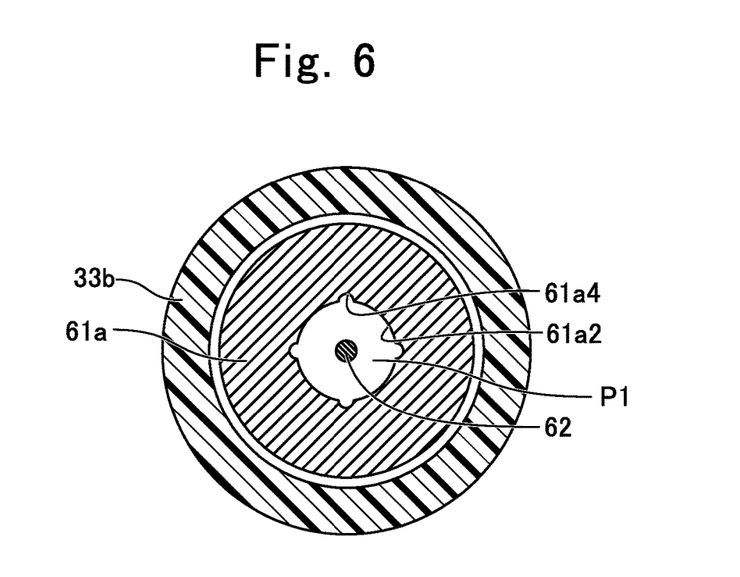
FIG. 6 is an enlarged sectional view taken along line VI-VI in FIG. 5, and is a sectional view of a part including a valve unit, taken along the radial direction.

The action of the valve unit 60 will be described with reference to FIG. 2 and FIG. 4 to FIG. 6. Here, FIG. 5 and FIG. 6 show the case where the valve body 62 is in a first state, and FIG. 2 and FIG. 4 show the case where the valve body 62 is in a second state.

The first state is a state in which the valve body 62 forms a forward flow path P1 between the valve body 62 and the inner circumferential surface of the valve housing body 61a of the valve housing 61 by the pressure of the low-pressure fuel in the case where the high-pressure fuel does not flow back. The second state is a state in which the valve body 62 forms an orifice flow path P2 having a smaller flow path sectional area than the forward flow path P1 between the valve body 62 and the inner circumferential surface of the valve housing body 61a of the valve housing 61 in the case where the high-pressure fuel flows back.

First, the case where the valve body 62 is in the first state will be described with reference to FIG. 5 and FIG. 6. In the case where the high-pressure fuel does not flow back, the low-pressure fuel regulated to a certain pressure by the low-pressure pump 12 and the pressure regulator 13 is supplied to the pump body 16b of the high-pressure pump 16 via the first low-pressure pipe 14, the connector 15, and the second low-pressure pipe 16a. At this time, in the connector 15, the flowing direction of the low-pressure fuel is a direction from the first tube portion 31 toward the second tube portion 32 of the connector body 30 (from left to right in FIG. 5). Therefore, a force that the valve body 62 of the valve unit 60 receives from the low-pressure fuel acts in a direction against the energizing force of the energizing member 63.

Here, the energizing force of the energizing member 63 is set to be not greater than the regulated pressure of the low-pressure fuel. Therefore, when the pressure of the low-pressure fuel acts on the valve body 62, the energizing member 63 is compressed. Accordingly, as shown in FIG. 5 and FIG. 6, the valve body 62 is located at a first-state position distant from the first contact portion 61a2 of the valve housing body 61a. Thus, the forward flow path P1 is formed between the first contact portion 61a2 and the valve body 62. The forward flow path P1 is formed around the entire circumference in the circumferential direction of the valve body 62. Further, in the forward flow path P1, the pressure of the low-pressure fuel is hardly reduced. Therefore, the low-pressure fuel flows into the pump body 16b of the high-pressure pump 16, in a state of being kept at a desired pressure.

Next, the case where the valve body 62 is in the second state will be described with reference to FIG. 2 and FIG. 4. In the case where the high-pressure fuel flows back, the high-pressure fuel exists in the second low-pressure pipe 16a. Meanwhile, the low-pressure fuel exists in the first low-pressure pipe 14. The fuel acting on the valve body 62 has a pressure difference. Accordingly, the high-pressure fuel attempts to flow from the second low-pressure pipe 16a to the first low-pressure pipe 14 side. Thus, the valve body 62 is pressed to the first contact portion 61a2 side by the pressure of the high-pressure fuel, so as to come to a second-state position.

Since the valve body 62 and the first contact portion 61a2 are in contact with each other, flow of the high-pressure fuel in the circumferential-direction contact area is restricted. Here, the valve body 62 is in contact with the first contact portion 61a2, but is not in contact with the first orifice groove 61a4. Thus, in a state in which the valve body 62 is in contact with the first contact portion 61a2, the orifice flow path P2 is formed between the valve body 62 and the first orifice groove 61a4 of the valve housing body 61a. In FIG. 4, the orifice flow paths P2 are formed at four locations in the circumferential direction. The flow path sectional area of each orifice flow path P2 is extremely smaller than that of the forward flow path P1.

Therefore, the high-pressure fuel in the second low-pressure pipe 16a flows to the first low-pressure pipe 14 via the orifice flow paths P2. Thus, change in the pressure of the high-pressure fuel occurring in the pump body 16b of the high-pressure pump 16 is inhibited from being directly transferred to the first low-pressure pipe 14. That is, pulsation in the first low-pressure pipe 14 is reduced.

3-4. Effects

As described above, in the case where the high-pressure fuel flows back, the valve body 62 comes into the second state, so that the orifice flow paths P2 are formed inside the connector 15. That is, the orifice flow paths P2 are interposed between the high-pressure pump 16 and the low-pressure pump 12. Owing to the action of the orifice flow paths P2, pulsation in the first low-pressure pipe 14 on the low-pressure pump 12 side with respect to the connector 15 is reduced.

On the other hand, in the case of the steady state in which the high-pressure fuel does not flow back, the valve body 62 comes into the first state, so that the forward flow path P1 larger than the orifice flow path P2 is formed between the valve housing body 61a and the valve body 62. In the steady state, the valve body 62 comes into the first state in which the forward flow path P1 is formed by the pressure of the low-pressure fuel. Thus, the low-pressure fuel is assuredly supplied to the high-pressure pump 16 side. That is, in the steady state, the valve body 62 does not hamper flow of the low-pressure fuel.

In addition, the valve housing 61 and the valve body 62 are configured to be mounted in the connector 15. Thus, the valve housing 61 and the valve body 62 are easily provided. Here, as described above, in the case where the high-pressure fuel flows back, the valve body 62 comes into the second state in which the orifice flow paths P2 are formed. If a flow path is formed between the inner circumferential surface of the connector body 30 and the valve housing 61, the flow path may serve as an orifice flow path. This may hinder exertion of a desired pulsation reducing effect based on the orifice flow paths P2 between the valve housing 61 and the valve body 62.

Considering the above, the valve housing 61 is provided with a seal structure interposed for restricting flow of fuel between the valve housing 61 and the inner circumferential surface of the connector body 30. In the above description, the elastic seal member 64 is applied as the seal structure. Providing the seal structure prevents formation of a flow path between the connector body 30 and the valve housing 61. Thus, the orifice flow paths P2 formed between the valve housing 61 and the valve body 62 exert a desired pulsation reducing effect.

Further, the valve unit 60 including the valve housing 61 and the valve body 62 can be assembled in advance outside the connector body 30. Thus, adjustment regarding the forward flow path P1 and the orifice flow paths P2 becomes easy, thereby enabling exertion of a desired pulsation reducing effect.

Conceivably, the valve housing 61 and the valve body 62 are assumed to be mounted at, for example, the first low-pressure pipe 14, instead of being mounted in the connector 15. However, in the case where the valve housing 61 and the valve body 62 are mounted at the first low-pressure pipe 14, formation of a seal structure between the first low-pressure pipe 14 and the valve housing 61 is not easy. As a result, the orifice flow paths P2 between the valve housing 61 and the valve body 62 may be hindered from exerting a desired pulsation reducing effect. Therefore, mounting the valve housing 61 and the valve body 62 inside the connector body 30 enables the pulsation reducing effect to be easily and assuredly exerted.

4. Structure of Connector 115 in Second Embodiment

Figure 7:
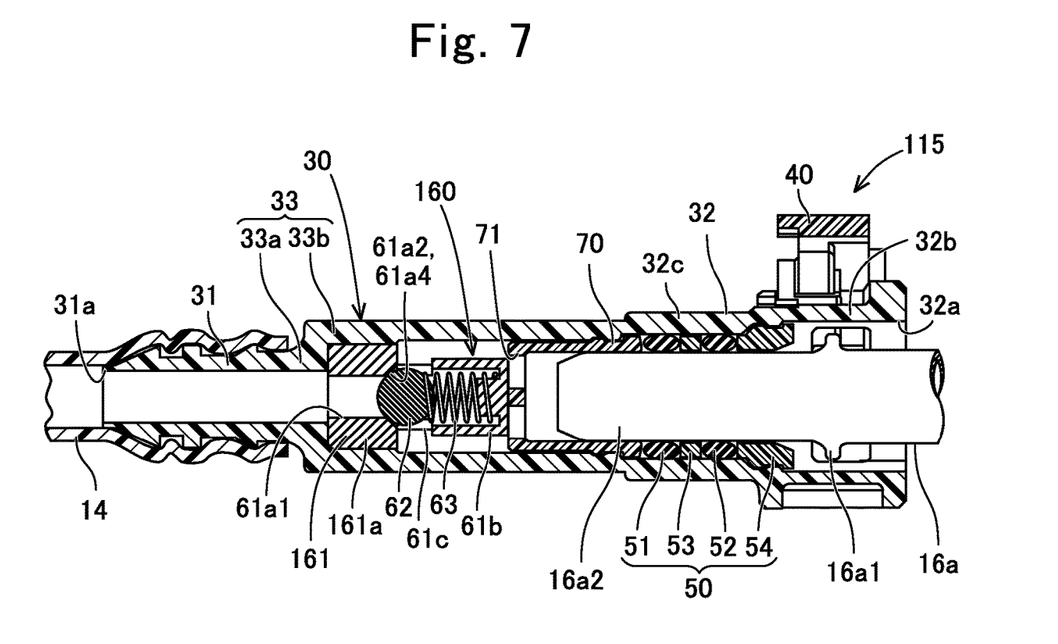
FIG. 7 is a sectional view of a connector according to the second embodiment, taken along the axial direction.

The structure of a connector 115 according to the second embodiment will be described with reference to FIG. 7. Here, the same components as those in the connector 15 according to the first embodiment are denoted by the same reference characters and the description thereof is omitted. The connector 115 includes the connector body 30, the retainer 40, the seal unit 50, a valve unit 160, and the fixation bush 70. The valve unit 160 includes a valve housing 161, the valve body 62, and the energizing member 63. That is, the valve unit 160 in the second embodiment is configured without an elastic seal member.

The valve housing 161 includes a valve housing body 161a, the energizing member mounting portion 61b, and the connection portion 61c. The valve housing body 161a includes the center hole 61a1, the first contact portion 61a2, and the first orifice groove 61a4, but does not include a seal groove. The outer circumferential surface of the valve housing body 161a is in direct contact with the inner circumferential surface of the large-diameter tube portion 33b of the third tube portion 33 of the connector body 30. That is, the connector 115 has a surface seal structure in which the large-diameter tube portion 33b and the valve housing body 161a are indirect contact with each other. The surface seal structure is formed by the valve housing body 161a being press-fitted into the third tube portion 33 with an interference provided around the entire circumference, for example.

That is, the inner circumferential surface of the large-diameter tube portion 33b of the third tube portion 33 and the outer circumferential surface of the valve housing body 161a form the surface seal structure, thereby restricting flow of fuel between the inner circumferential surface of the large-diameter tube portion 33b and the outer circumferential surface of the valve housing body 161a. Thus, the orifice flow paths P2 formed between the valve housing 161 and the valve body 62 exert a desired pulsation reducing effect.

In addition, the surface seal structure also has a function of restricting the flow-path-direction position of the valve housing 161 relative to the third tube portion 33 of the connector body 30. Thus, positioning of the valve housing 161 is assuredly made. In addition, owing to adoption of the surface seal structure, the connector 115 may have a configuration not using the fixation bush 70.

5. Structure of Connector 215 in Third Embodiment

Figure 8:
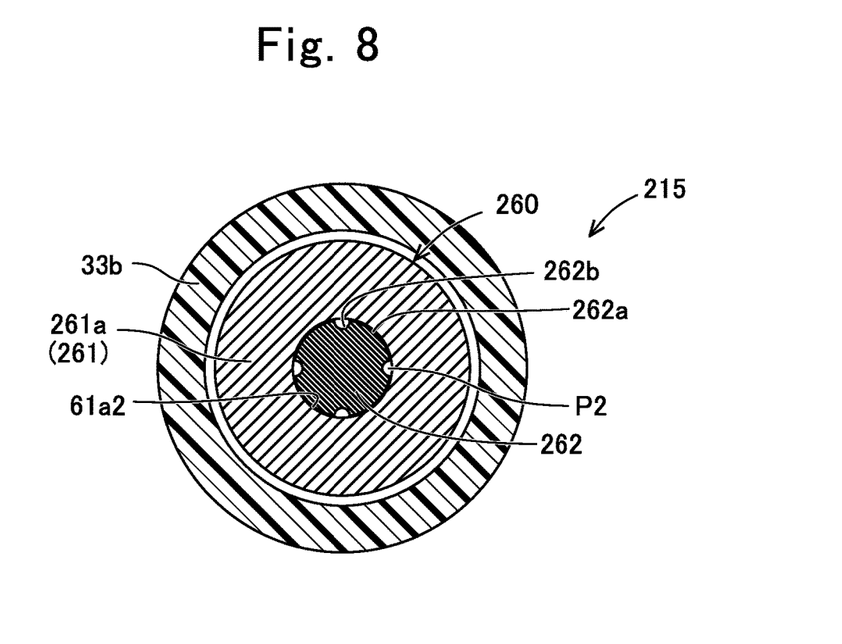
FIG. 8 is a sectional view of a part including a valve unit in a connector according to the third embodiment, taken along the radial direction.

The structure of a connector 215 according to the third embodiment will be described with reference to FIG. 8. Here, the same components as those in the connector 15 according to the first embodiment are denoted by the same reference characters and the description thereof is omitted. The connector 215 includes the connector body 30, the retainer 40, the seal unit 50, a valve unit 260, and the fixation bush 70. The valve unit 260 includes a valve housing 261, a valve body 262, and the energizing member 63. The valve housing 261 includes a valve housing body 261a, the energizing member mounting portion 61b, and the connection portion 61c. The valve housing body 261a includes the center hole 61a1, the first contact portion 61a2, and the seal groove 61a3, but does not include the first orifice grooves.

On the other hand, the valve body 262 includes a second contact portion 262a formed in a partially spherical shape, and second orifice grooves 262b. When the valve body 262 is in the first state, the second contact portion 262a becomes distant from the first contact portion 61a2 so as to form the forward flow path P1. When the valve body 262 is in the second state, the second contact portion 262a comes into contact with the first contact portion 61a2 so as to restrict flow of the high-pressure fuel. The second orifice grooves 262b are provided so as to be adjacent to the second contact portion 262a in the circumferential direction, and form the orifice flow paths P2 when the valve body 262 is in the second state. Here, the valve body 262 is held by the energizing member 63 so that the attitude thereof is not changed. The connector 215 according to the third embodiment also provides substantially the same effects as in the connector 15 according to the first embodiment.

What is claimed is:

1. A connector to be connected to a low-pressure pipe through which low-pressure fuel supplied from a low-pressure pump flows, in a fuel supply system in which the low-pressure fuel is pressurized by a high-pressure pump and high-pressure fuel is supplied to an internal combustion engine, the connector comprising:

a connector body formed in a tubular shape;

a valve housing formed in a tubular shape and provided inside the connector body with a seal structure interposed therebetween, the seal structure being configured to restrict flow of fuel between the valve housing and an inner circumferential surface of the connector body;

a valve body stored inside the valve housing, the valve body being configured to, when the high-pressure fuel does not flow back, come into a first state in which a forward flow path is formed between the valve body and an inner circumferential surface of the valve housing by a pressure of the low-pressure fuel, and when the high-pressure fuel flows back, come into a second state in which an orifice flow path having a smaller flow path sectional area than the forward flow path is formed between the valve body and the inner circumferential surface of the valve housing; and a fixation bush formed in a bottomed tubular shape and guiding an end of the low-pressure pipe which is to be inserted on an inner circumferential surface thereof, the fixation bush being configured to restrict a flow-path-direction position of the valve housing relative to the connector body.

2. The connector according to claim 1, further comprising an elastic seal member mounted to an outer circumferential surface of the valve housing, the elastic seal member being in contact with the inner circumferential surface of the connector body and serving as the seal structure.

3. The connector according to claim 1, wherein
the seal structure is a surface seal structure in which the inner circumferential surface of the connector body and an outer circumferential surface of the valve housing are in direct contact with each other.

4. The connector according to claim 3, wherein
the surface seal structure has a function of restricting the flow-path-direction position of the valve housing relative to the connector body.

5. The connector according to claim 1, wherein
the valve housing includes a first contact portion configured to, when the valve body is in the first state, become distant from the valve body so as to form the forward flow path, and when the valve body is in the second state, come into contact with the valve body so as to restrict flow of the high-pressure fuel,
the connector further comprising a spring configured to urge the valve body toward the first contact portion of the valve housing.

6. The connector according to claim 5, wherein
the valve housing includes a first contact portion orifice groove provided so as to be adjacent to the first contact portion in a circumferential direction, the first orifice groove being configured to form the orifice flow path when the valve body is in the second state.

7. The connector according to claim 5, wherein the valve body includes:

a second contact portion configured to, when the valve body is in the first state, become distant from the first contact portion so as to form the forward flow path, and when the valve body is in the second state, come into contact with the first contact portion so as to restrict the flow of the high-pressure fuel; and a second contact portion orifice groove provided so as to be adjacent to the second contact portion in a circumferential direction, the second orifice groove being configured to form the orifice flow path when the valve body is in the second state.

8. The connector according to claim 5, wherein
the valve housing includes:

a valve housing body formed with a center hole through which the fuel flows and provided inside the connecting body with the seal structure interposed therebetween, the seal structure being configured to restrict the flow of fuel between the valve housing body and the inner circumferential surface of the connector body and forming the forward flow path and the orifice flow path between the valve housing body and the valve body;

a spring mounting portion located so as to be distant in the axial direction from the valve housing body and mounting the spring thereon to form a flow path for fuel between an outer circumferential surface and the inner circumferential surface of the connector body; and a connecting portion connecting the valve housing body and the spring mounting portion for allowing communication between the center hole of the valve housing body and an outer peripheral area around the spring mounting portion, wherein the fixation bush is brought into contact with the spring mounting portion.

9. The connector according to claim 1, wherein the valve body has a spherical shape.

10. The connector according to claim 1, wherein the fixation bush is provided with a plurality of through holes in a bottom surface thereof in a circumferential direction, serving as a flow path for fuel.

11. The connector according to claim 1, wherein an outer circumferential surface of the fixation bush is formed in a recessed and projecting shape and is engaged with a recessed and projecting shape of the inner circumferential surface of the connector body.

* * * * *